(12) United States Patent
Cheng

(10) Patent No.: US 8,763,652 B1
(45) Date of Patent: Jul. 1, 2014

(54) DUAL-PURPOSE AIR NOZZLE FOR AN INFLATOR

(71) Applicant: Wuyi New Mingzhu Inflator Making Co., Ltd., Wuyi (CN)

(72) Inventor: Rongbo Cheng, Jinhua (CN)

(73) Assignee: Wuyi New Mingzhu Inflator Making Co., Ltd., Hardware Machinery Industry Zone, Wuyi, ZJ (CN)

( * ) Notice: Subject to any disclaimer, the term of this patent is extended or adjusted under 35 U.S.C. 154(b) by 0 days.

(21) Appl. No.: 14/060,551

(22) Filed: Oct. 22, 2013

(30) Foreign Application Priority Data

Apr. 1, 2013 (CN) .......................... 2013 2 157632 U

(51) Int. Cl.
*B65B 31/00* (2006.01)
*B60S 5/04* (2006.01)

(52) U.S. Cl.
CPC ......................................... *B60S 5/04* (2013.01)
USPC ............................ 141/38; 141/311 R; 37/223

(58) Field of Classification Search
USPC .................... 141/311 R, 38; 137/223
See application file for complete search history.

(56) References Cited

U.S. PATENT DOCUMENTS 5,960,815 A * 10/1999 Wang ....................... 137/118.03

* cited by examiner

*Primary Examiner* — Jason K Niesz
(74) *Attorney, Agent, or Firm* — Justin W. McCabe

(57) ABSTRACT

An inflator usable for multiple valve types is disclosed that is simply designed and efficient to assemble. The dual-purpose air nozzle for an inflator optimizes the shape of the pressing block and the locations of a first pressing block and a second pressing block, as well as optimizes the location of the shunting cavity so as to reduce the number of components included with a mult-valve adaptable inflator and also to facilitate assembly.

4 Claims, 2 Drawing Sheets

DUAL-PURPOSE AIR NOZZLE FOR AN INFLATOR

RELATED APPLICATION DATA

This application claims the benefit of priority of Chinese Patent No. CN 203130420 U, filed on Apr. 1, 2013 and emitted "Dual-Purpose Air Nozzle for an inflator", and is incorporated by reference herein in its entirety.

FIELD OF THE INVENTION

The present utility model relates to the technical field of daily supplies, in particular, relates to a dual-purpose air nozzle for an inflator.

BACKGROUND it is needed to connect an air nozzle at the air outlet of an inflator when a tire of bicycle (or motorcycle, compact car, etc.) is inflated, and the air nozzle is connected with the air valve of the tire. The size of the air nozzle has to match the type of the air valve in order to inflate the tire. However, in Europe and America, for instance, there are two types of air valves: American type and Britain and France type. These two commonly used air valve are different sizes and configurations, thus causing the necessity of equipping, an inflator with air nozzles of different sizes in order to connect to the air valves.

In view of this problem, a dual-purpose air nozzle for an inflator appeared. Referring to FIG. 1 for details, the dual-purpose air nozzle for an inflator comprises a shell 10, on a side wall of which an air inlet 20 is arranged, a first through-hole 11 and a second through-hole 12 are formed on the left wall of the shell, a first rubber seal 31 and a second rubber seal 32 are set in the first through-hole 11 and the second through-hole 12 respectively, a first pressing block 41 and a second pressing block 42 are arranged on the right of the first rubber seal 31 and the second rubber seal 32 respectively, a first channel 411 communicating with the first rubber seal 31 and a second channel 421 communicating with the second rubber seal 32 are set in the first pressing block 41 and the second pressing block 42 respectively, the first channel 411 and the second channel 421 are converged in a shunting cavity 50, the shunting cavity 50 is communicated with the air inlet 20 and inside the shunting cavity 50 an non-return ball 51 is arranged. Wherein, both the first pressing block 41 and the second pressing block 42 are in a shape of vertical bar and arranged abreast, and the shunting cavity 50 is located between the first pressing block 41 and the second pressing block 42. In addition, a push block 80 is arranged on the right of the first pressing block 41 and the second pressing block 42, a spanner 60 is pin jointed to the right side of the shell 10 through a pivot 63, the spanner 60 has a first side 61 and a second side 62, and the perpendicular distance from the first side 61 to the pivot 63 is different from the perpendicular distance from the second side 62 to the pivot 63. The right side of the push block 80 matches the spanner 60.

As such, when performing inflation, a user can choose the corresponding rubber seal according to the type of the air valve (that is choosing the first rubber seal or the second rubber seal as required), and then wrench the spanner 60 to drive the push block 80 so as to push the first pressing block 41 and the second pressing block 42 to the left, thus the first rubber seal 31 and the second rubber seal 32 can achieve good communication with the air valve after being compressed. Besides, as the air pressure of the communicating, joint connecting the unused rubber seal and the shunting cavity 50 is lower than that of the communicating joint connecting the being, used rubber seal and the shunting cavity 50, therefore, the communicating joint connecting the unused rubber seal and the shunting, cavity 50 is sealed by the non-return ball 51 to achieve a proper flowing direction of the air pressed by the inflator.

Drawbacks: it employs more components and complex structures, and as the non-return ball has to be arranged between the first pressing block and the second pressing block it requires the operation of accurate positioning when being assembled, thus making it more complicated.

SUMMARY OF THE DISCLOSURE

An object of the present utility model is to provide a dual-purpose air nozzle for an inflator, which is simply structured and can be assembled easily.

A technical solution employed in the present utility model is a dual-purpose air nozzle for an inflator, comprising: a shell, on a side wall of which an air inlet 20 is arranged, a first through-hole and a second through-hole are formed on the left wall of the shell, a first rubber seal and a second rubber seal are arranged in the first through-hole and the second through-hole respectively, a first pressing block and a second pressing block are arranged on the right of the first rubber seal and the second rubber seal respectively, a first channel communicating with the first rubber seal and a second channel communicating with the second rubber seal are set in the first pressing block and the second pressing block respectively, the first channel and the second channel are converged in a shunting cavity, the shunting cavity is communicated with the air inlet and inside the shunting cavity an non-return ball is arranged, a spanner is pin jointed with the right, side of the shell through a pivot, the spanner has a first side and a second side, the perpendicular distance between the first side and the pivot is different from the perpendicular distance between the second side and the pivot, the first pressing block has a transverse pan and an upright part connecting with each other in a "L" shape, the left side of the transverse part is connected with the first rubber seal, the left side of the upright part contacts with the right side of the second pressing block and the right side of the upright part matches the spanner, besides, the shunting cavity is arranged on the right of the second channel, and the communicating joint of the shunting cavity and the first channel is located on the right of the shunting cavity.

A sealing ring is arranged between the upright part and the inner wall of the shell.

The non-return ball is a round rubber ball.

Compared with the prior an, the present utility model has the advantages of being simple in structure and easily assembled. The dual-purpose air nozzle for an inflator of the present utility model optimizes the shape of the first pressing block and the locations of the first pressing block and the second pressing block so as to make the first pressing block drive the second pressing block to move, thus avoiding the use of a push block and making, it simpler. In addition, the present utility model optimizes the location of the shunting cavity, so it only needs to mount the second pressing block, the non-return ball, the first pressing block in sequence when performing assembly thereby avoiding the positioning of the non-return ball, thus lowering the difficulty in assembling.

BRIEF DESCRIPTION OF THE DRAWINGS

For the purpose of illustrating the invention, the drawings show aspects of one or more embodiments of the invention.

However, it should be understood that the present invention is not limited to the precise arrangements and instrumentalities shown in the drawings, wherein.

DESCRIPTION OF THE DISCLOSURE

Figure 1:
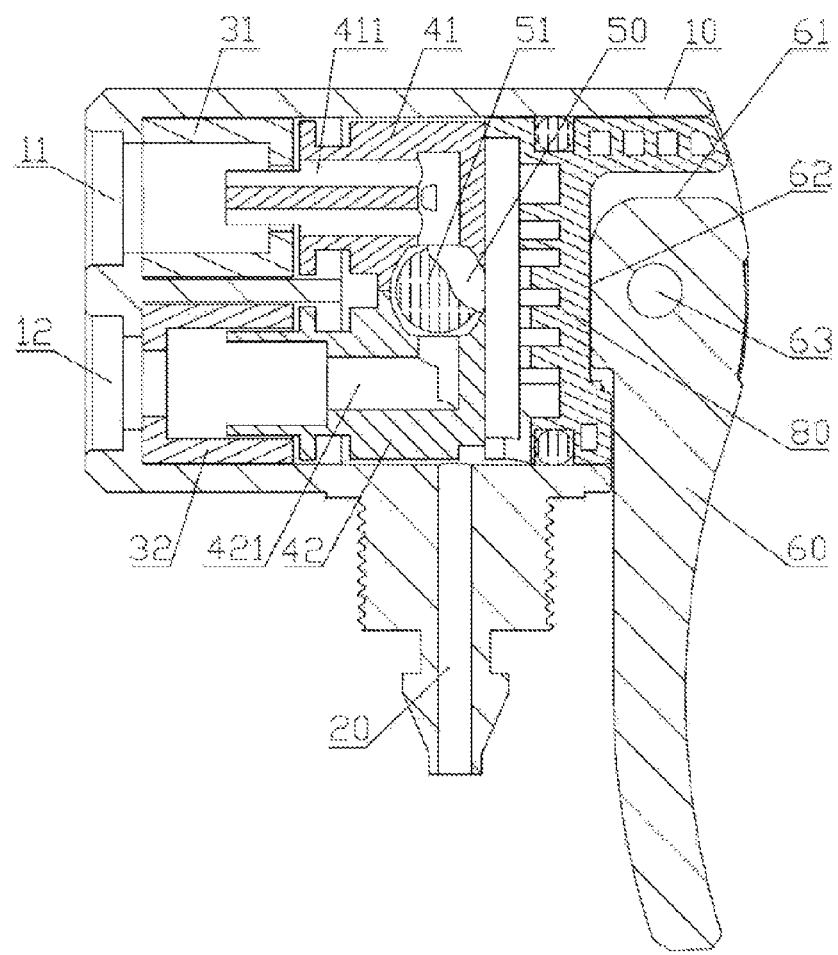
FIG. 1 is a front section view of a prior art dual-purpose air nozzle for an inflator.
Figure 2:
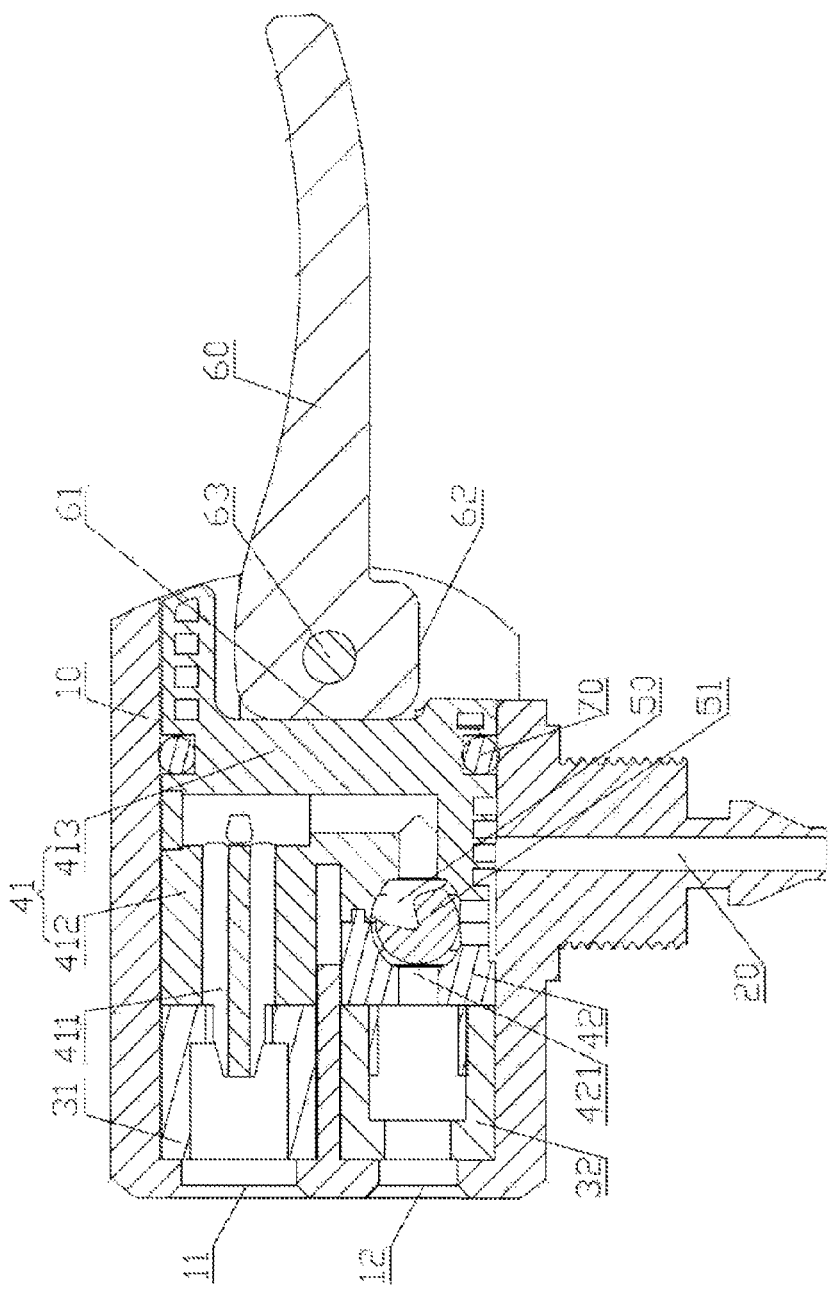
FIG. 2 is a front section view of a dual-purpose air nozzle for an inflator according to an embodiment of the present invention.

An embodiment of a dual-purpose air nozzle for an inflator according to an embodiment of the present invention is shown in FIG. 2. In this embodiment, the dual-purpose air nozzle for an inflator comprises a shell 10, on a side wall of which an air inlet 20 is arranged, at first through-hole 11 and a second through-hole 12 are formed on the left wall of the shell, and a first rubber seal 31 and a second rubber seal 32 are arranged in the first through-hole 11 and the second through-hole 12 respectively. The sizes of the first rubber seal 31 and second rubber seal 32 are different, for instance, corresponding to the air valve of American type and the air valve of Britain and France type respectively. A first pressing block 41 and a second pressing block 42 are arranged on the right of the first rubber seal 31 and the second rubber seal 32, respectively, and a first channel 411 communicating with the first rubber seal 31 and a second channel 421 communicating with the second rubber seal 32 are set in the first pressing block 41 and the second pressing block 42 respectively, the first channel 411 and the second channel 421 are converged in a shunting cavity 50, the shunting cavity 50 is communicated with the air inlet 20 and inside the shunting cavity 50 an non-return ball 51 is arranged. In use, air is pressed into the Shunting cavity 50 through the air inlet 20, thereafter, it enters into the first channel 411 or the second channel 421. A spanner 60 is pin jointed with the right side of the shell 10 through a pivot 63, which has a first side wall 61 and a second side wall 62, and the perpendicular distance between the first side 61 and the pivot 63 is different from the perpendicular distance between the second side 62 and the pivot 63. Continuing further, the first pressing block 41 has a transverse part 412 and a upright part 413 connecting in a "L" shape, the left side of the transverse part 412 is connected with the first rubber seal 31; the left side of the upright part 413 contacts with the right side of the second pressing block 42 and the right side of the upright part 413 matches the spanner 60. That is after wrenching the spanner 60, the first side 61 or the second side 62 pushes the right side of the upright part 413 so as to make the first rubber seal 31 and the second rubber seal 32 relaxed or pressed. As such, compared with the prior dual-purpose air nozzle for an inflator, there is no need to use the push block 80 to push the first pressing block 41 and the second pressing block 42 simultaneously, making it simpler. Besides, the shunting cavity 50 is arranged on the right of the second channel 421, and the communicating joint of the shunting cavity 50 and the first channel 411 is located on the right of the shunting 50. In this way, when performing assembly, the side on which the first through-hole 11 and the second through-hole 12 of the shell 10 are arranged is placed downward, the rubber seals (including the first rubber seal and the second rubber seal), the second pressing block 42, the non-return ball 51, the first pressing block 41 and the spanner 60 can be mounted in sequence thereby the positioning step for the non-return ball 51 can be avoided, thus lowering the difficulty in assembly and increasing the work efficiency.

In a preferred embodiment, a sealing ring 70 is arranged between the upright part 413 and the inner wall of the shell 10, thus enabling the dual-purpose air nozzle for an inflator to have a better inflating effect.

Further, the non-return ball 51 can be a rubber round ball. Rubber is easy to obtain and the non-return ball 51 can have a better sealing effect to the communicating joint of the first channel 411 and the shunting cavity 50 as well as the communicating joint of the second channel 421 and the shunting cavity 50.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A dual-purpose air nozzle for an inflator comprising: a shell (10), on a side wall of which an air inlet (20) is arranged, a first through-hole (11) and a second through-hole (12) are formed on another side wall of the shell, a first rubber seal (31) and a second rubber seal (32) are arranged in the first through-hole (11) and the second through-hole (12) respectively, a first pressing block (41) and a second pressing block (42) are arranged on the proximate the first rubber seal (31) and the second rubber seal (32) respectively, a first channel (411) communicating with the first rubber seal (31) and a second channel (421) communicating with the second rubber seal (32) are arranged in the first pressing block (41) and the second pressing block (42) respectively, the first channel (411) and the second channel (421) are converged in a shunting cavity (50), the shunting cavity (50) is communicated with the air inlet (20) and inside the shunting cavity (50) an non-return ball (51) is arranged, a spanner (60) is pin jointed to a side of the shell (10) through a pivot (63), the spanner (60) has a first side (61) and a second side (62), and the vertical distance between the first side (61) and the pivot (63) is different from that between the second side (62) and the pivot (63), characterized in that: the first pressing block (41) has a transverse part (412) and an upright part (413) connecting in a "L" shape, the transverse part (412) is connected with the first rubber seal (31), the upright part (413) contacts with the second pressing block (42) and matches the spanner (60), and wherein, the shunting cavity (50) is arranged collinearly with the second channel (421), and a communicating joint connects the shunting cavity (50) and the first channel (411).

2. The dual-purpose air nozzle for an inflator according to claim 1, wherein a sealing ring (70) is arranged between the upright part (413) and the inner wall of the shell (10).

3. The dual-purpose air nozzle for an inflator according to claim 2, wherein the non-return ball (51) is a rubber round ball.

4. The dual-purpose air nozzle for an inflator according to claim 1, wherein the non-return ball (51) is a rubber round ball.

* * * * *